(12) United States Patent
Innocenti

(10) Patent No.: US 12,099,520 B2
(45) Date of Patent: Sep. 24, 2024

(54) MINIMIZING READ AND UPDATE CONFLICT ERRORS IN BLOCKCHAINS

(71) Applicant: Oracle International Corporation, Redwood Shores, CA (US)

(72) Inventor: Carlo Innocenti, Redwood Shores, CA (US)

(73) Assignee: Oracle International Corporation, Redwood Shores, CA (US)

(*) Notice: Subject to any disclaimer, the term of this patent is extended or adjusted under 35 U.S.C. 154(b) by 80 days.

(21) Appl. No.: 17/895,240

(22) Filed: Aug. 25, 2022

(65) Prior Publication Data

US 2024/0070166 A1    Feb. 29, 2024

(51) Int. Cl.
G06F 16/27 (2019.01)
G06F 16/23 (2019.01)
H04L 9/00 (2022.01)

(52) U.S. Cl.
CPC .......... *G06F 16/27* (2019.01); *G06F 16/2358* (2019.01); *G06F 16/2365* (2019.01); *H04L 9/50* (2022.05)

(58) Field of Classification Search
CPC ... G06F 16/27; G06F 16/2358; G06F 16/2365
USPC ...................................................... 707/625
See application file for complete search history.

(56) References Cited

U.S. PATENT DOCUMENTS

| 5,546,582 | A | 8/1996 | Brockmeyer |
| 11,108,553 | B2* | 8/2021 | Irazabal ................... H04L 9/32 |
| 2018/0349458 | A1 | 12/2018 | Guirguis |
| 2019/0372772 | A1* | 12/2019 | Novotny ............... H04L 9/3239 |
| 2020/0125556 | A1 | 4/2020 | Yang |
| 2020/0167243 | A1 | 5/2020 | Rauh |
| 2020/0310860 | A1 | 10/2020 | Arumugam |
| 2020/0387432 | A1* | 12/2020 | Kamijoh ............... G06F 3/0619 |
| 2021/0034606 | A1 | 2/2021 | Stamos |
| 2021/0149775 | A1* | 5/2021 | Novotny ............... H04L 9/3239 |
| 2022/0027348 | A1 | 1/2022 | Manevich |
| 2022/0358098 | A1 | 11/2022 | Stamos |
| 2023/0062434 | A1 | 3/2023 | Wagner |
| 2024/0070166 | A1 | 2/2024 | Innocent |

OTHER PUBLICATIONS

Innocenti, U.S. Appl. No. 18/301,115, filed Apr. 14, 2023, Non-Final Rejection, Mar. 27, 2024.

(Continued)

*Primary Examiner* — Michael Pham
(74) *Attorney, Agent, or Firm* — Hickman Becker Bingham Ledesma LLP; Marcel K. Bingham

(57) ABSTRACT

A read-write set of a blockchain transaction specifies a delta value by which to add or subtract from the current value of a delta-enabled world state record. In connection with committing the blockchain transaction to a world state record, the then-current value of the world state record is read and adjusted by the delta to determine the actual value to assign to the world state record. The actual value computed is correct even though the version number and current value at the time the read-write set was generated may have changed by the time the commitment of the blockchain transaction has commenced. Multi-version concurrency is foregone.

20 Claims, 5 Drawing Sheets

(56) References Cited

OTHER PUBLICATIONS

Zsolt et al., "StreamChain: Do Blockchains Need Blocks?", Proceedings of the 2nd Workshop on Scalable and Resilient Infrastructures for Distributed Ledgers, Dec. 10, 2018, pp. 1-6, XP093181815.
Anonymous, "Ledger", Jul. 6, 2022, XP093181665, 10 pages, retrieved: https://hyperledger-fabric.readthedocs.io/en/release-2.2/ledger/ledger.htmldocumentation.
Androulaki et al., "Endorsement in Hyperledger Fabric", 2019 IEEE International Conference on Blockchain (Blockchain), IEEE, Jul. 14, 2019, pp. 510-519.
Alkhatib et al., "Transaction Management in Distributed Database Systems: the Case of Oracle's Two-Phase Commit", Journal of information systems education, Mar. 1, 2023, p. 95, XP093181830.

\* cited by examiner

MINIMIZING READ AND UPDATE CONFLICT ERRORS IN BLOCKCHAINS

FIELD OF THE INVENTION

The present disclosure relates to concurrency control in blockchain systems.

BACKGROUND

In a permissioned blockchain system, blockchain clients submit transaction requests to the blockchain system to change a database referred to as the world state. The changes are recorded in the blockchain as blockchain transactions. A blockchain system is decentralized and distributed, meaning the blockchain system has multiple copies of both the blockchain and the world state. A blockchain system comprises multiple peers, some or all of which are responsible for participating in forming and approving blockchain transactions and/or recording the blockchain transactions in their respective blockchain copy.

The world state comprises world state records that each contain one or more values. A world state record may be, for example, a key-value pair that represents currency tokens spent and generated for a transaction.

Changes to the world state can be specified using read-write set semantics. Under read-write semantics, a blockchain transaction specifies a change to a world state record using a read-write set that specifies the version of the world state record to which to apply a change ("read version") and the new actual value resulting from the change ("write value"). The read version is typically the most recent version to which to apply a change. For example, a change to a world state record changes the record value from 1000 to 900. The record value of 1000 is version #11 for the record. The read-write set for the change includes read version #11 and write value 900.

In an embodiment, it is only proper to commit a change to a world state record if the read-write set for the change includes a read version that matches the version of the world state record value being changed. This requirement ensures that a change committed represents a single state change to a world state record value and that the change is made in the proper order relative to other state changes to the value. Enforcing this requirement is referred to herein as multi-version concurrency control (MVCC).

A blockchain transaction may change values of one or more world state records. A blockchain transaction includes a "read set" and a "write set". The read set includes read versions of world state records to be changed by the blockchain transaction. The write set includes the write values for the world state records changed by the blockchain transaction. A read set and write set may contain other information about the changes. For example, a read set may include the read value corresponding to a read version.

Smart Contracts: Explicit-Value-Assignment Semantics

A blockchain transaction may be requested by remotely calling a function on the blockchain system. Such a remotely called function is referred to as a smart contract. A smart contract is a function recorded and approved by a blockchain system that can be invoked by a blockchain client to request a blockchain transaction.

Smart contracts are typically implemented using explicit-value-assignment semantics. In explicit-value-assignment semantics, the blockchain transactions specify an actual value to which to set a world state record. Often, a smart contract is configured to retrieve a current value of the world state record and determine an actual value to which to set the world state record based on the current value.

In an illustrative approach to smart contracts, a smart contract includes instructions that specify get and put operations. A get operation retrieves the current value of a world state record. A put operation, which is specified by a "put instruction", explicitly assigns a world state record to an actual value specified by the instruction. In general, for a blockchain transaction created through the execution of a put instruction in a smart contract, the write value for the world state record to which the put instruction is applied equals the value specified by the put instruction applied.

Version Contention and Overhead

In a blockchain system, multiple peers may receive transaction requests. A blockchain transaction for each transaction request must be approved by multiple peers in the blockchain system. Multiple blockchain transactions may be grouped into a "transaction block" that is to be appended to every copy of the blockchain in the blockchain system. The appending of a block containing a blockchain transaction and the change specified by the blockchain transaction to the world state are committed together.

With all the aforementioned processing needed to effect a change to the world state of a blockchain system, it is very likely, if not certain, that multiple blockchain transactions can specify different changes to the same read version of a world state record. Under read-write semantics, only one of the multiple blockchain transactions can be committed to the world state. The other blockchain transactions are rejected for the purpose of committing changes to the world state. The clients that requested the rejected blockchain transactions requests are informed, so they may make a new substitute transaction request if desired.

Generating multiple read-write sets for the same read version of the same world state record value is referred to herein as version contention. The concomitant rejection of the blockchain transactions and the re-submission of transaction requests caused by version contention is an overhead of MVCC and is referred to herein as version contention overhead.

Balance-Directed Transactions & Overhead Under MVCC

Blockchain systems can be used to track the balance of currency assets that are updated through transactions. This approach is referred to herein as the balance-directed transaction approach. For example, the balances of vendors and customers are recorded in respective world state records. A $50 payment made by a customer to the vendor is represented by (a) a blockchain transaction with a pair of read-write sets that change both a currency account of the customer and a currency account of the vendor. The read-write set for the customer specifies a write value that, in effect, represents a $50 subtraction. For example, the value of the read version and the write value may be 400 and 350, respectively. Similarly, the read-write set for the vendor currency account in effect represents a $50 addition.

Some balances are referred to as change aggregators because balances are subject to a high degree of changes. For example, a currency asset may be an account of a high-volume vendor. Blockchain transactions for payments by clients to the vendor may involve a multitude blockchain transactions against a single world state record representing a currency account of the vendor. This multitude of blockchain transactions can lead to an impractically high level of version contention for the world state records of change aggregators. Therefore, an approach the alleviates such version contention for change aggregators is desirable.

Unspent Transaction Output

An approach that alleviates version contention for change aggregators is an approach referred to as Unspent Transaction Output ("UTOX"). In UTOX, balances are represented as an aggregation of discrete tokens that are analogous to coins or bills. Tokens can correspond to different quantities of an asset, such as a currency. For example, an account consists of 10 tokens that each corresponds to $1 and 10 other tokens that each corresponds to $10. The balance of the account is the aggregation of these tokens, which is $110.

A block transaction transferring assets from an account to another account must have an input and output of tokens that aggregate to the same amount. The input tokens are treated as spent tokens and cannot be used as input for another block transaction. The output tokens are treated as unspent tokens and can be used as input to another block transaction.

Continuing with the current example, to make a $50 payment from one account to another, the input to a block transaction comprises a $100 token, and the output comprises two $50 tokens, one $50 token going to the account of the payee and the other going to the account of the payor. The $100 is treated as spent, and the two $50 tokens are treated as unspent.

In general, each token corresponds to one world state record. Thus, accounts can be represented by a multitude of world state records in the aggregate. Under UTXO, block transactions do not update a single version of a balance that is represented by a single world state record; instead, the block transactions update one version of possibly many world state records that each represent an individual token, some of which may not even be committed and are not yet involved in another block transaction. As a result, the version contention occurs much less often under UTXO.

Unfortunately, configuring client applications to interface with a blockchain system using UTXO is more complicated, while configuring client applications to use the balance-directed transaction approach is much simpler to implement. Therefore, it is desirable to have an approach that allows blockchain system clients to use the balance-directed approach in a way that avoids version concurrency conflicts.

DETAILED DESCRIPTION

Figure 1:
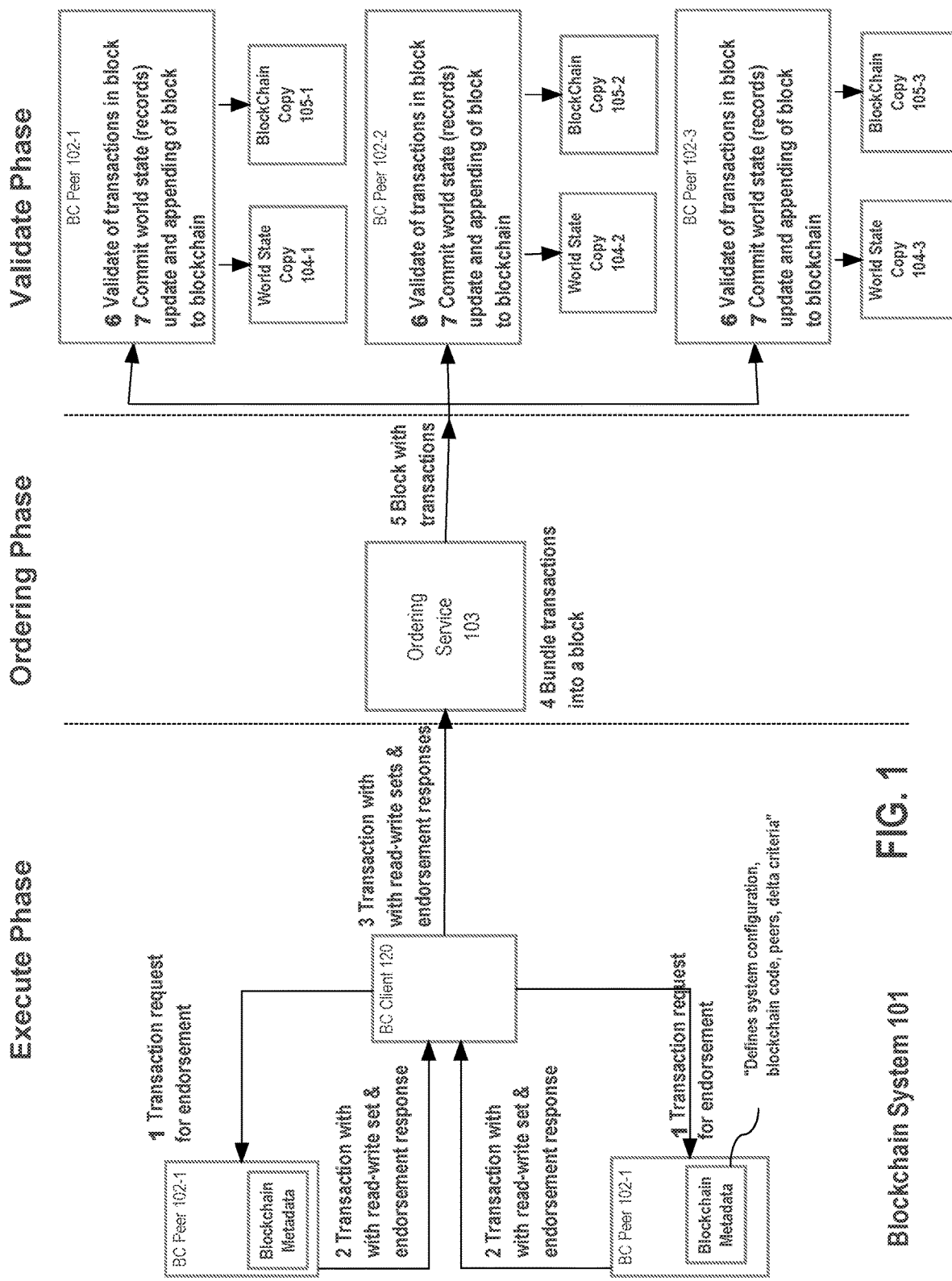
FIG. 1 is a diagram depicting a blockchain system according to an embodiment of the present invention.

In the following description, for the purposes of explanation, numerous specific details are set forth in order to provide a thorough understanding of the present invention. It will be apparent, however, that the present invention may be practiced without these specific details.

General Overview

Described herein is an approach that minimizes version contention for balanced-offset transactions. The approach achieves this effect by foregoing MVCC, as shall be explained in greater detail. The new approach is applicable to any numeric value of a world state record that has been designated as "delta-enabled". Under the new approach, a read-write set of a blockchain transaction specifies a delta value by which to add or subtract from the current value of a delta-enabled world state record. In connection with committing the blockchain transaction to a world state record, the then-current value of the world state record is read and adjusted by the delta to determine the actual value to assign to the world state record. The actual value computed is correct even though the version number and current value at the time the read-write set was generated may have changed by the time the commitment of the blockchain transaction has commenced.

Typically, implementations of blockchain transaction requests use explicit-value-assignment semantics. The new approach is designed to allow such implementations to continue to use explicit-value-assignment semantics. There is no need to re-implement blockchain transaction requests. The approach calculates a delta value based on the then-current value of the world state record and the specified actual value and stores the delta value in the write set. At commit time, a new, possibly different actual value is computed based on the delta value and the then-current value of the world state record.

For example, a smart contract is invoked to request a blockchain transaction representing a $100 payment from a customer account to a vendor account. The world state record for the vendor account is the key-value pair having the key myaccount. Following explicit-value-assignment semantics, a new actual value to which to set myaccount is computed. Specifically, the smart contract executes a get operation for key myaccount and retrieves the value 1000. The current version of the key is v50. The smart contract computes a new balance and executes a put operation on key myaccount to set its value to 1100.

Because myaccount is designated as delta-enabled, the write set generated for the blockchain transaction includes a delta value computed based on the current value and the new actual value specified by the put operation, which is 100, i.e., 1100-1000.

At the time the blockchain transaction is to be committed, myaccount had changed to 800 and the version changed to v51. Because myaccount is delta-enabled, MVCC is forgone, and the new version number is ignored. The current value of 800 is read, and the delta value of 100 is applied to generate a new actual value of 900.

According to an embodiment, delta criteria may be associated with a delta-enabled world state record. A blockchain transaction must satisfy delta criteria in order to be committed to the world state record. For example, delta criteria may specify a minimum value for a world state record. A delta value that would result in an actual value below the minimum value invalidates the blockchain transaction and prevents the blockchain transaction from being committed.

The new approach is referred to herein as the Delta Set approach.

Exemplary Blockchain System

FIG. 1 depicts Blockchain System 101, an illustrative blockchain system used to illustrate the Delta Set approach. Blockchain system 101 follows an approach referred to herein as the Execute-Order-Validate approach, the phases and steps of which are depicted in FIG. 1. As the name of the approach indicates, the phases include the Execute Phase, the Order Phase, and the Validate Phase. Each of these phases and the steps performed therein shall be explained in greater detail.

Blockchain System 101 includes peer computing nodes ("BC peers") that participate in the Execute Phase and/or Validate Phase phases. BC peer 102-1 and BC peer 102-2 participate in the Execute Phase and the Validate Phase. BC peer 102-3 performs in only the Validate Phase. A computing node in a blockchain system that participates in the Validate Phase is referred to herein as a peer. A peer may also participate in the Execute Phase and/or the Ordering Phase. BC peer 102-1, 102-2 and 102-3 may be referred to herein collectively as BC peers 102.

The Ordering Phase is performed by an ordering service which may include computing nodes that may or may not be peer nodes. Computing nodes that perform in the Ordering Phase are not depicted in FIG. 1.

As shall be explained in further detail, each of the peer nodes that participate in the Validate Phase may maintain a blockchain copy of the distributed blockchain of Blockchain System 101 and a world state copy of the distributed world state of Blockchain System 101. BC Peer 102-1, 102-2, and 102-3 maintain both World State Copies 104-1, 104-2 & 104-3 and Blockchain Copies 105-1, 105-2, & 105-3, respectively. World State Copies 104-1, 104-2 & 104-3 may be referred to collectively as the Distributed World State 104. Blockchain Copies 105-1, 105-2, & 105-3 may be referred to collectively as Distributed Blockchain 105.

Blockchain Metadata

Each peer in Blockchain System 101 includes blockchain metadata, which defines the configuration and other aspects of Blockchain System 101. Blockchain metadata defines, inter alia, the peers of Blockchain System 101, the endorsement policy, blockchain code, whether a world state record is delta-enabled, and delta criteria for the world state record. The blockchain metadata is stored in a way that supports versioning. Versions of blockchain metadata are tracked as the blockchain metadata is changed.

Delta criteria may be based on the actual value of the delta-enabled world state record or the delta value. Examples of delta criteria include a minimum threshold criterion (a threshold value an actual value of world state record may not be less than), a maximum threshold criterion (a threshold value an actual value of world state record may not be less than) and a maximum delta value threshold.

Execute-Order-Validate Approach

Endorsers are the peers in a blockchain system that participate in the Execute Phase. Not all peers participate in the Execute Phase. A peer that does not participate in the Execute Phase is referred to herein as non-endorser peer.

A blockchain client sends a blockchain transaction request to each of the endorsers. Each endorser simulates the blockchain transaction requested to generate a read-write set. The blockchain transaction, which includes the read-write sets generated by the endorsers, are sent to the ordering service.

In the Ordering Phase, the ordering service groups blockchain transactions generated by endorsers into ordered blocks. The ordered blocks are sent to the peers for processing in the Validate phase. In this phase, the peers perform validation checks on the block transactions in each of the blocks and commit valid transactions to the distributed world state and blocks to the distributed blockchain.

The steps performed in each phase are explained below and illustrated using the elements of Blockchain System 101 depicted in FIG. 1.

Endorsement Phase

Step 1: Blockchain Client 120 (see FIG. 1) transmits a blockchain transaction request to BC peer 102-1 and BC peer 102-2. The blockchain transaction may entail changes to multiple world state records.

In an embodiment of the present invention, the blockchain transaction is transmitted by remotely calling a smart contract on each of BC peer 102-1 and BC peer 102-2. The smart contract was recorded in Distributed Blockchain 105 as an approved function that can be invoked by a blockchain client on any endorser to request a blockchain transaction with Blockchain System 101.

Step 2: BC peer 102-1 and BC peer 102-2 simulate the execution of the requested blockchain transaction on their respective copies of Distributed World State 104, which are World State Copy 104-1 and World State Copy 104-2. The simulation generates a read-write set. BC peer 102-1 and BC peer 102-2 each send an endorsement response that includes a digital signature generated by each based on certain content of the endorsement response. The endorsement response also includes data indicating whether the endorser endorses (i.e., approves) the blockchain transaction and the version of blockchain metadata at the time of endorsement. An endorsement response that approves a blockchain transaction is referred to herein as an endorsement. The endorsement responses are sent to Blockchain Client 120.

If the blockchain transaction request is transmitted by invoking a smart contract, the endorsement response includes an identity of the smart contract assigned by Blockchain System 101 and the input arguments to the invocation of the smart contract.

Step 3: The Blockchain Client 120 collects the endorsement responses and packages the endorsement responses into a blockchain transaction. The blockchain transaction is sent to Ordering Service 103.

Ordering Phase

Step 4: Ordering Service 103 receives the blockchain transactions sent by blockchain clients, including Blockchain Client 120, and organizes the blockchain transactions into ordered transaction blocks.

Step 5: The ordered transactions blocks are sent to all the peers of Blockchain System 101. These are BC peer 102-1, 102-2, and 102-3.

Validate Phase

Step 6: Upon receiving a transaction block, each peer of BC peers 102 independently validates each block transaction in a transaction block by performing various validation checks as follows. Each peer determines whether a block transaction has a sufficient number of endorsements according to an endorsement policy. The digital signatures from each endorser in the blockchain transaction are checked. MVCC validation may be performed on the read-write set of each blockchain transaction.

An endorsement policy may require that the endorsements satisfy a blockchain metadata version concurrency. That is, endorsements are made by peers that had the same blockchain metadata version ("at-endorsement-version") when endorsements were made. The blockchain metadata concurrency check ensures, for example, that the same version of a smart contract was used for the blockchain transaction.

After performing the validation checks, each peer determines for each blockchain transaction in the transaction block whether the blockchain transaction is valid or invalid. The transaction block is modified to designate for each blockchain transaction whether the blockchain transaction is valid or invalid.

Step 7: Each peer of BC peers 102 modifies world state records of the valid blockchain transactions in their respective copy of the world state. No change to the world state is made for an invalid blockchain transaction. Each peer appends the respective transaction block in the respective blockchain copy of the peer. Each peer commits both the change to their copy of the world state and the appending of the transaction block to their copy of the blockchain together. A transaction block includes blockchain transactions that are valid or invalid.

An Execute-Order-Validate approach is described in Jeet Ann Chacko, et al., entitled *Why Do My Blockchain Transactions Fail?* (ACM SIGMOD 2021), dated 8 Mar. 2021, the entire contents of which are incorporated herein by reference. Blockchain systems are also described in U.S. patent application Ser. No. 16/261,363, filed by Carlo Innocenti on Jan. 29, 2019, the entire contents of which are incorporated herein by reference (computing nodes are referred to therein as nodes)

Execute Phase Operations

Figure 2:
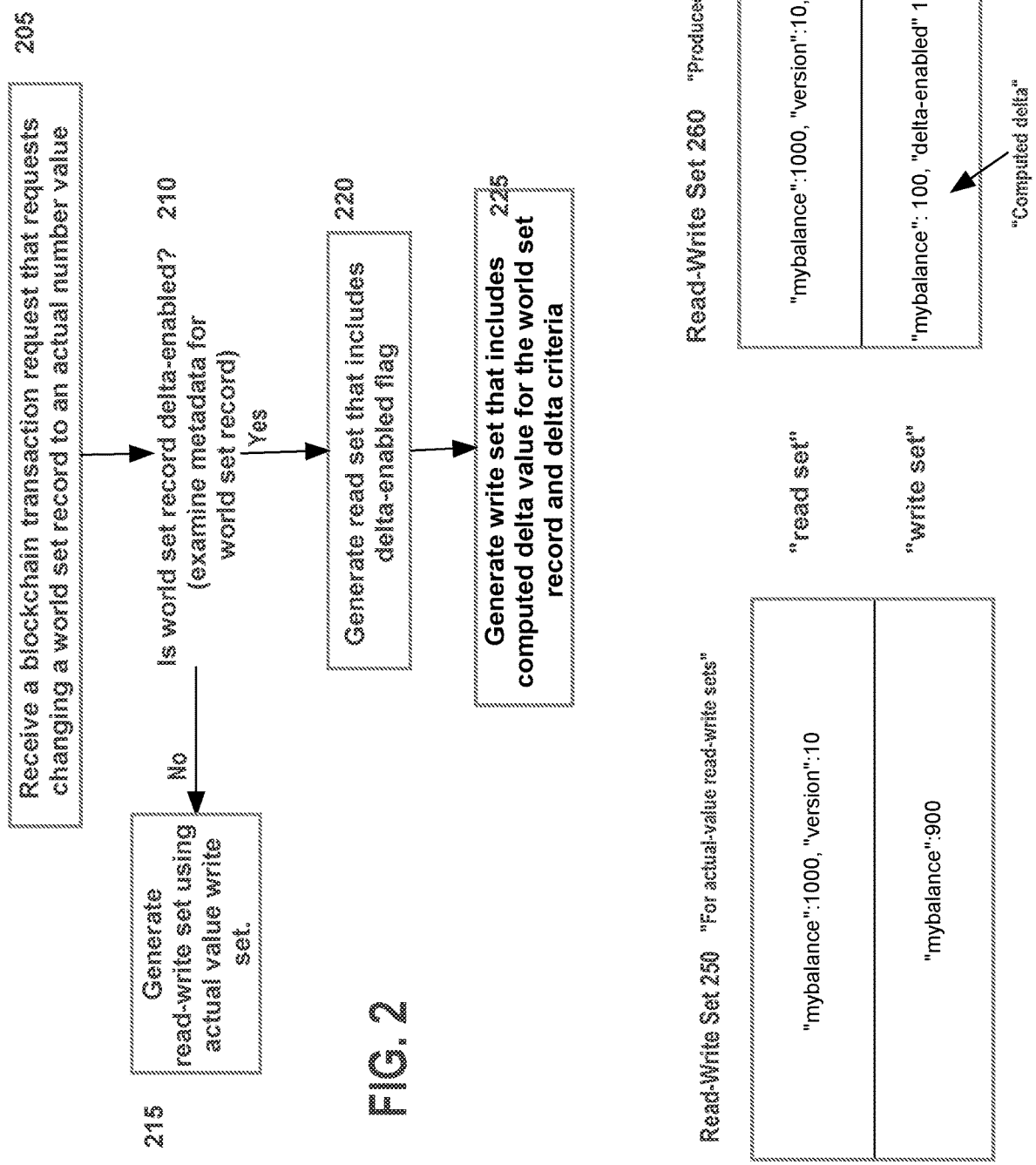
FIG. 2 is a diagram depicting operations performed for blockchain transactions during the Execute Phase according to an embodiment of the present invention.

FIG. 2 is a diagram depicting operations and read-write sets generated by endorsers during the Execute Phase under the delta-set approach. Read-Write Set 250 and 260 are provided to compare how read-write sets are generated with or without the delta-set approach.

Referring to FIG. 1, (205) an endorser receives a blockchain transaction request that requires changing a world state record to a number value. In the current illustration, the blockchain transaction request specifies to change the value of key mybalance to 900.

(210) An endorser determines whether the world state record is delta-enabled. To make this determination, the endorser examines blockchain metadata that specifies whether the world state record is delta-enabled.

(215) If the blockchain metadata does not specify the world state record is delta-enabled, then the endorser generates an "actual-value" read-write set. Read-write Set 250 is the actual-value read-write set that is generated in the current illustration. The attributes of the read-write set are key-value pairs. The read set includes a read value for mybalance of 1000 and a read version equal to 10. The write set specifies that the write value is 900.

If the blockchain metadata does specify that the world state record is delta-enabled, then the endorser generates a "delta-value" read-write set. (220) The read set of the delta-value read-write set includes a delta-enabled flag specifying that the world state record is delta-enabled. In the current illustration, Read-Write Set 260 is the delta-value read-write set generated. Like the read set of Read-Write Set 250, the read set of Read-Write Set 250 includes a read value for mybalance equal to 1000 and a read version equal to 10. In addition, the read set includes the key delta-enabled, which is a flag specifying that the world state record mybalance is delta-enabled.

The write-set generated includes a computed delta value and may include delta criteria. The delta value is computed as the difference between the actual number value requested minus the read value of the read set. The write set specifies a delta value for the world state record rather than an actual value. In the current illustration, the delta value is computed as 1000-900, which is 100. The key mybalance is equal to the delta value 100. The write set also includes the delta-enabled flag delta-enabled.

The key-value pairs "min": 0 and "max": 5000 identify delta criteria. The key-value pair "min": 0 specifies a minimum threshold of 0, and the key-value pair "max": 5000 specifies a maximum threshold of 5000. Blockchain metadata stored at an endorser defines delta criteria for a delta-enabled world state record. An endorser reads the metadata definition and generates the data to add for the delta criteria to the write set based on the metadata definition.

The delta flag and delta criteria are included in the write set to avoid a non-endorser participant from using out-of-date blockchain metadata as a source of delta criteria. In general, endorsement validation requires that all validly endorsed blockchain transactions be endorsed by endorsers that have the same version of blockchain metadata ("at-endorsement version") at the instant of their respective endorsements. However, this requirement does not apply to a non-endorser peer. A non-endorser peer may not have the at-endorsement version of the blockchain metadata and thus may not have access to the version of delta criteria that is consistent with the at-endorsement version.

Validate Phase Operations

Figure 3:
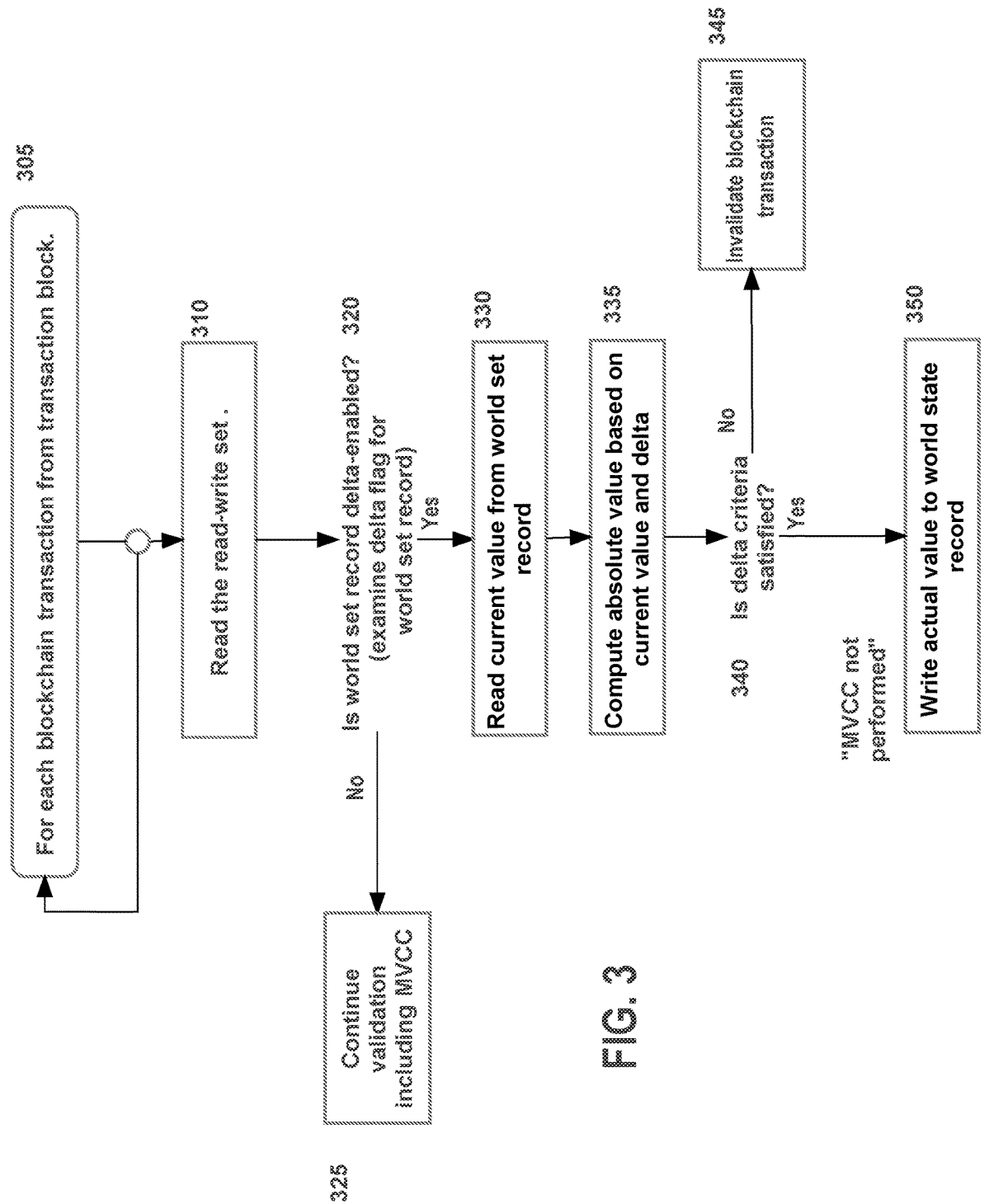
FIG. 3 is a diagram depicting operations performed for blockchain transactions during the Validate phase according to an embodiment of the present invention.
Figure 4:
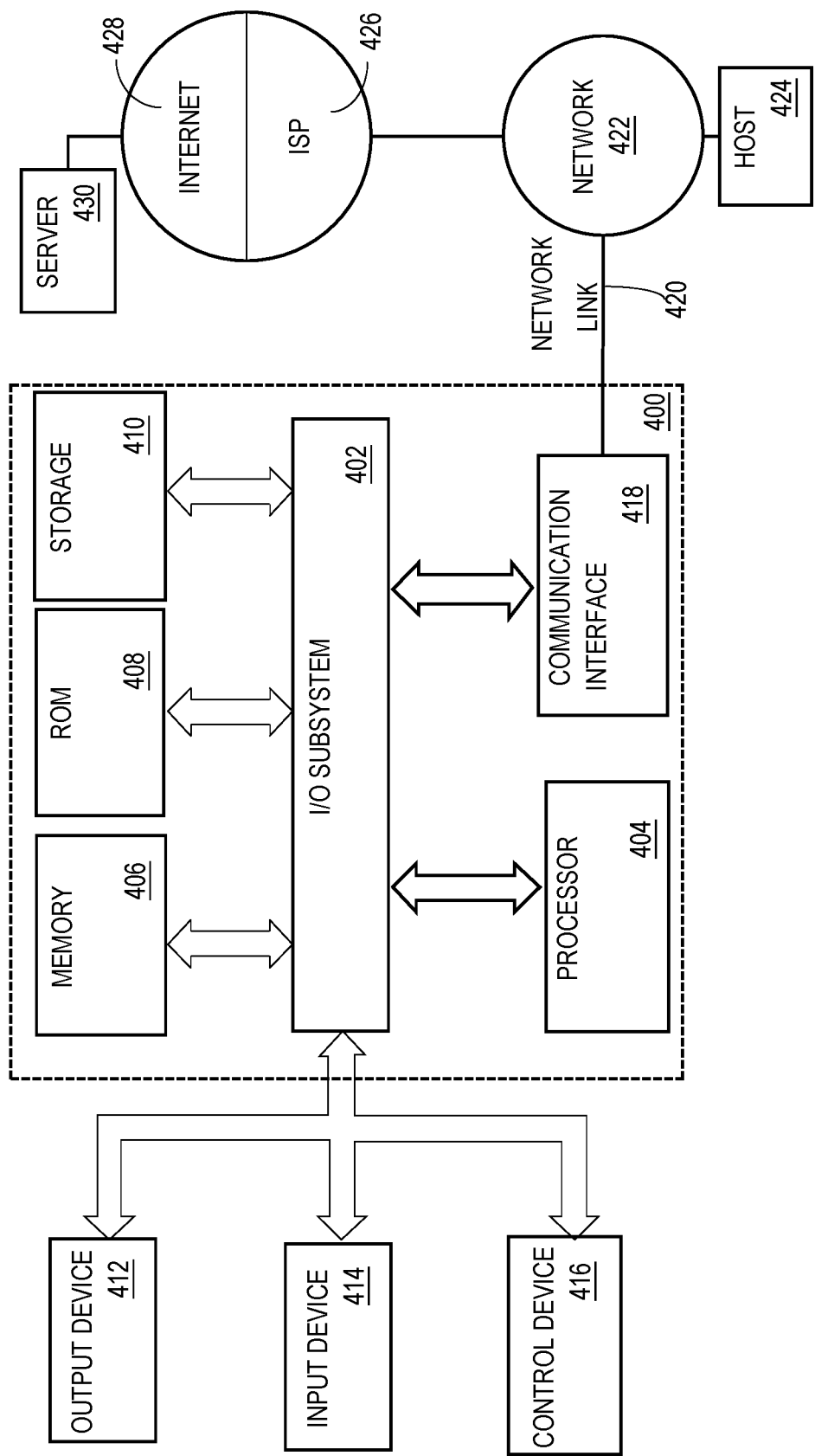
FIG. 4 is a diagram depicting a computer system that may be used to implement an embodiment of the present invention.

FIG. 3 is a diagram depicting operations performed during the Validate Phase according to the delta-set approach. Specifically, FIG. 3 highlights operations performed that are particular to the delta-set approach. The operations are performed with respect to each blockchain transaction in a transaction block and for each world state record to which a read-write set of the blockchain transaction applies. A transaction block often includes multiple blockchain transactions and a read-write set may specify changes for multiple world state records.

Referring to FIG. 3, (305), for each blockchain transaction in a transaction block, (310) a peer reads the read-write set of the blockchain transaction. (320) The peer determines whether a world state record changed by the blockchain transaction is delta-enabled. The determination is made by determining whether the write set in the read-write set includes a delta-enabled flag that specifies that the world state record is delta-enabled. (325) If the write set does not include a delta-enabled flag that specifies that the world state record is delta-enabled, then the peer continues validation processing of the world state record using MVCC.

(330) If the write set includes a delta-enabled flag that specifies the world state record is delta-enabled, then the peer reads the current value from the world state record. The peer then computes that actual value to which to set the world state record by applying the delta value to the current value.

In the current illustration, (310) a peer of BC peers 102 reads the read-write set of Read-Write Set 260. The peer determines that a delta-enabled flag in the write set specifies that the key mybalance is delta-enabled. (320) The peer reads the current value of the key mybalance, which in the current illustration is 800. (330) The peer then applies the delta value 100 in the write set, subtracting 100 from 800 to generate an actual value of 700. (335)

(340) The peer determines whether delta criteria are satisfied. The peer makes this determination based on the delta-criteria read from the write set. (345) In response to determining that the delta criteria are not satisfied, the peer invalidates the blockchain transaction by marking the transaction block accordingly. (35) In response to determining that the delta criteria are satisfied, the peer writes the actual value to the world state record.

In the current illustration, (340) a peer 102 reads the delta criteria from write set of Read-Write Set 260. The peer determines that the write set specifies a maximum threshold criterion of 5000 and a minimum threshold criterion of 0. The peer determines that the actual value of 700 satisfies this delta criteria.

As described earlier, the Validate Phase performs various validation checks, such as checking for block metadata version concurrency and checking for a sufficient number of endorsements. These checks may be made before or after determining whether delta criteria are satisfied (340). MVCC is not performed.

Blockchain Peers/Participants are Computing Nodes

Each peer or participant in a blockchain system may comprise one or more computing nodes. A computing node is a combination of one or more hardware processors that each share access to a byte-addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that each communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
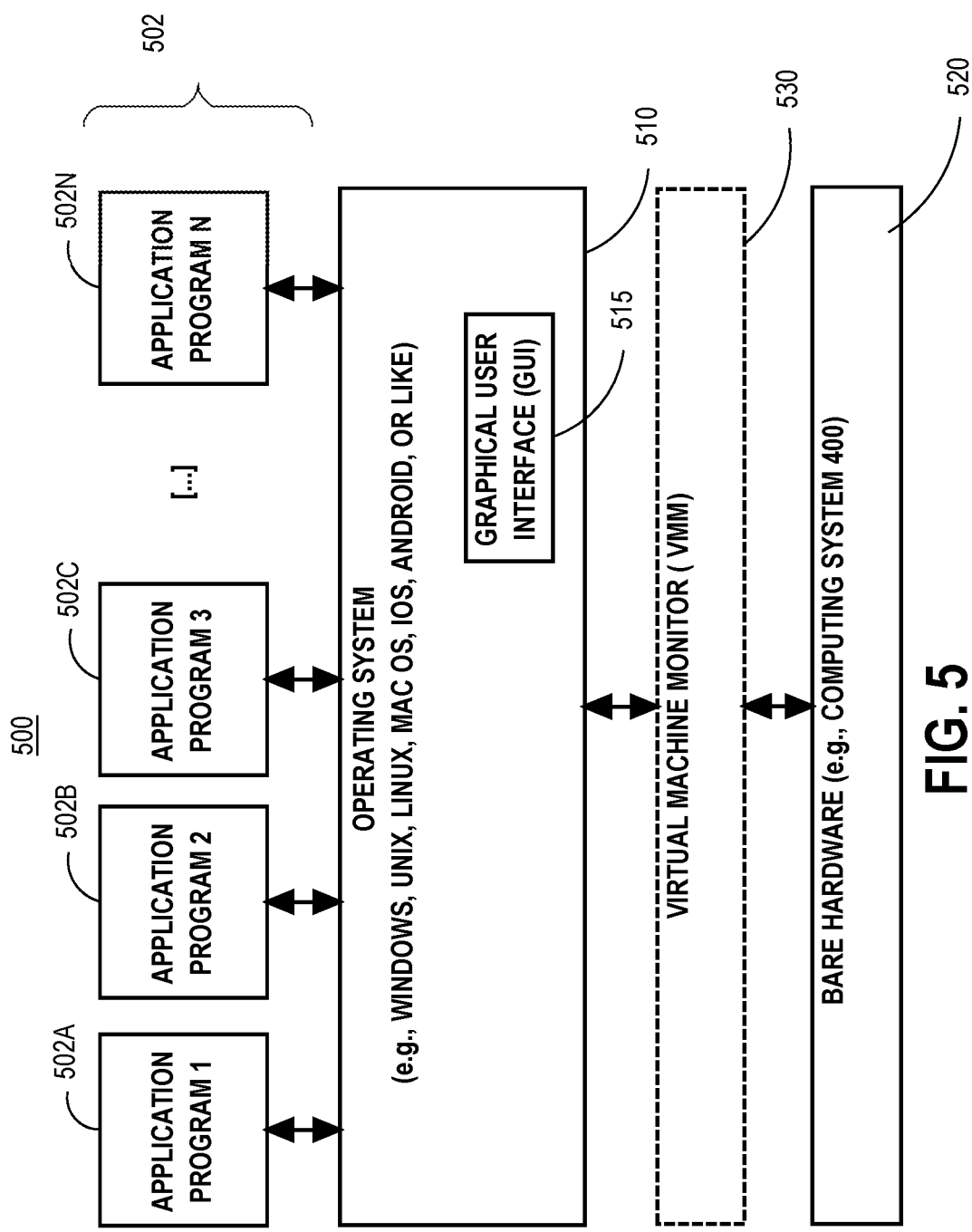
FIG. 5 depicts a software system that may be employed for controlling the operation.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

FIG. 6 is a block diagram of a basic software system 600 that may be employed for controlling the operation of computer system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 1106 and on fixed storage (e.g., hard disk or flash memory) 1110, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 1110 into memory 1106) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 1104) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
    within a blockchain system, receiving a transaction block that includes a first read-write set for a first blockchain transaction and a second read-write set for a second blockchain transaction, said first read-write set specifying a first change to a first world state record of a distributed world state of the blockchain system, said first read-write set including a first read set and a first write set, said second read-write set specifying a second change to a second world state record of said distributed world state, said second read-write set including a second write set;
    in response to determining that said first world state record is not delta-enabled,
        performing multi-version concurrency control for said first world state record, wherein performing multi-version concurrency control includes comparing a first version associated with said first world state record to a read version for said first world state record included in said first read set;
        changing a first current value of said first world state record to a write value included in said first write set;
    in response to determining that said second world state record is delta-enabled,
        reading a current value of a second version of said second world state record;
        applying a delta value included in said second write set to said current value to generate a new actual value;
        changing said current value of said second world state record to said new actual value.

2. The method of claim 1, further including:
    an endorser peer of said blockchain system receiving a request for a blockchain transaction that specifies a particular actual value to which to set said second world state record;
    in response to said endorser peer determining that said second world state record is delta-enabled:
        reading a particular current value of said second world state record,
        determining the delta value based on a difference between said particular current value and said particular actual value, and
        storing said delta value in said second write set.

3. The method of claim 1, wherein when reading a particular current value of said second world state record, a current version of said second world state record is different than said second version of said second world state record.

4. The method of claim 1, the method further including:
    determining whether one or more delta criteria are satisfied before changing said current value of said second world state record to said new actual value.

5. The method of claim 4, wherein said second read-write set includes data indicating said one or more delta criteria.

6. The method of claim 1, wherein determining that said second world state record is delta-enabled includes determining a flag in said second read-write set specifies that said second world state record is delta-enabled.

7. The method of claim 2, wherein said endorser peer determining that said second world state record is delta-enabled includes said endorser peer determining that blockchain metadata specifies that said second world state record is delta-enabled.

8. The method of claim 7, the method further including:
    said endorser peer reading metadata defining one or more delta criteria from blockchain metadata; and
    based on said metadata defining said one or more delta criteria, adding data indicating said one or more delta criteria to said second read-write set.

9. The method of claim 2, wherein receiving a request for a blockchain transaction that specifies a particular actual value to which to set said second world state record includes a blockchain client invoking a smart contract of said blockchain system.

10. The method of claim 9, further including said endorser peer executing said smart contract in response to said invoking a smart contract, wherein executing said smart contract includes executing a put operation to said second world state record to set said second world state record to said particular actual value.

11. One or more non-transitory computer-readable media storing one or more sequences of instructions that, when executed by one or more processors, cause:
within a blockchain system, receiving a transaction block that includes a first read-write set for a first blockchain transaction and a second read-write set for a second blockchain transaction, said first read-write set specifying a first change to a first world state record of a distributed world state of the blockchain system, said first read-write set including a first read set and a first write set, said second read-write set specifying a second change to a second world state record of said distributed world state, said second read-write set including a second write set;
in response to determining that said first world state record is not delta-enabled,
performing multi-version concurrency control for said first world state record, wherein performing multi-version concurrency control includes comparing a first version associated with said first world state record to a read version for said first world state record included in said first read set;
changing a first current value of said first world state record to a write value included in said first write set;
in response to determining that said second world state record is delta-enabled,
reading a current value of a second version of said second world state record;
applying a delta value included in said second write set to said current value to generate a new actual value;
changing said current value of said second world state record to said new actual value.

12. The one or more non-transitory computer-readable media of claim 11, wherein the one or more sequences of instructions include instructions that, when executed by one or more processors, cause:
an endorser peer of said blockchain system receiving a request for a blockchain transaction that specifies a particular actual value to which to set said second world state record;
in response to said endorser peer determining that said second world state record is delta-enabled:
reading a particular current value of said second world state record,
determining the delta value based on a difference between said particular current value and said particular actual value, and
storing said delta value in said second write set.

13. The one or more non-transitory computer-readable media of claim 11, wherein when reading a particular current value of said second world state record, a current version of said second world state record is different than said second version of said second world state record.

14. The one or more non-transitory computer-readable media of claim 11, wherein the one or more sequences of instructions include instructions that, when executed by one or more processors, cause:
determining whether one or more delta criteria is satisfied before changing said current value of said second world state record to said new actual value.

15. The one or more non-transitory computer-readable media of claim 14, wherein said second read-write set includes data indicating said one or more delta criteria.

16. The one or more non-transitory computer-readable media of claim 11, wherein determining that said second world state record is delta-enabled includes determining a flag in said second read-write set specifies that said second world state record is delta-enabled.

17. The one or more non-transitory computer-readable media of claim 12, wherein said endorser peer determining that said second world state record is delta-enabled includes said endorser peer determining that blockchain metadata specifies that said second world state record is delta-enabled.

18. The one or more non-transitory computer-readable media of claim 17, wherein the one or more sequences of instructions include instructions that, when executed by one or more processors, cause:
said endorser peer reading metadata defining one or more delta criteria from blockchain metadata; and
based on said metadata defining said one or more delta criteria, adding data indicating said one or more delta criteria to said second read-write set.

19. The one or more non-transitory computer-readable media of claim 12, wherein receiving a request for a blockchain transaction that specifies a particular actual value to which to set said second world state record includes a blockchain client invoking a smart contract of said blockchain system.

20. The one or more non-transitory computer-readable media of claim 19, wherein the one or more sequences of instructions include instructions that, when executed by one or more processors, cause said endorser peer executing said smart contract in response to said invoking a smart contract, wherein executing said smart contract includes executing a put operation to said second world state record to set said second world state record to said particular actual value.

* * * * *